(No Model.)
J. T. MILLER.
COTTON CHOPPER.
No. 323,192. Patented July 28, 1885.
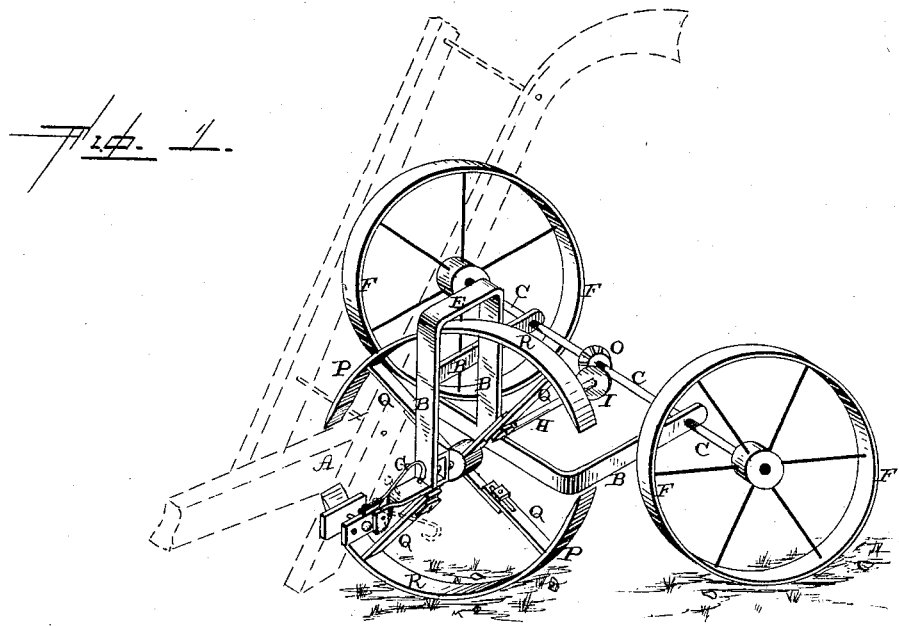
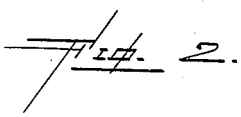
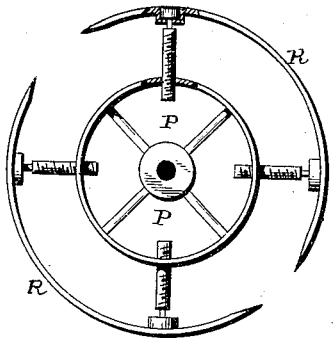
Witnesses.
L. F. Gardner
Jno. E. Prosperi
Inventor.
J. T. Miller,
per F. A. Lehmann,
Atty

UNITED STATES PATENT OFFICE.

JULIAN TOLBERT MILLER, OF BRANCHVILLE, TEXAS.

COTTON-CHOPPER.

SPECIFICATION forming part of Letters Patent No. 323,192, dated July 28, 1885.

Application filed March 17, 1885. (No model.)

*To all whom it may concern:*

Be it known that I, JULIAN T. MILLER, of Branchville, in the county of Milam and State of Texas, have invented certain new and useful Improvements in Cotton-Choppers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-choppers; and it consists in the combination of a suitable carrying-frame, which is to be attached to the plow, a shaft on which the chopping-wheel is placed, and which is operated by the revolving axle, and the chopping-wheel having adjustable cutting-blades, as will be more fully described hereinafter.

The object of my invention is to provide a cotton chopping attachment which can be fastened to a plow or cultivator, and used at the same time that the cotton is being worked.

Figure 1 is a perspective of a cotton-chopper embodying my invention. Fig. 2 is a detail view of the wheel.

A represents a plow or cultivator, and attached thereto is the carrying-frame B, which is supported at its rear end by the axle C and the two wheels F. This frame is arched upward, as shown at E, where the cotton-chopping wheel revolves under and at right angles thereto. In front of this arched portion the frame is jointed, so that the wheels can freely follow the inequalities of the ground, and a spring, G, which is preferably shaped as shown, is applied to the top of the frame, so as to bear upon the top of the jointed portion, and thus keep a steady pressure upon the top of the frame, for the purpose of keeping it pressed down toward the ground. By this means the chopping-wheel is kept more uniformly near the earth, and the wheels are forced quickly to the ground again after riding over an obstruction. Journaled in this frame is the shaft H, which has a pinion, I, on its rear end, to engage with a corresponding wheel, O, on the revolving axle C. The forward movement of the plow causes the wheels and axle to revolve, and this motion is communicated to the shaft and the chopping-wheel P, secured thereto. This wheel consists of the central portion or hub and the adjustable arms Q, to which the cutting-blades R are secured. If the wheel is constructed as shown in Fig. 1, these arms Q are slotted at their inner ends and bolted to the projections on the hub. By means of the projections and the slotted ends of the arms the arms can be adjusted in and out in relation to the shaft at will, and thus the blades be expanded or contracted. One end of each blade may be forced outward to any desired extent beyond the other, and then this forced-out end will do the chopping. By forcing the blades outward the distance between the ends of the blades is increased, and thus a greater space left between the chops, and by contracting the blades their ends are brought nearer together and a less space is left.

In the wheel shown in Fig. 2 the blades or cutters are adjusted by means of the four set-screws—two to each cutter or blade.

Any other devices or means for adjusting the cutters may be used, as the two sets here shown are mere samples.

Having thus described my invention, I claim—

1. The combination of the frame, the revolving shaft journaled therein, and the chopping-wheel having the adjustable semicircular cutters, which are arranged in relation to each other so as to form virtually the rim of the wheel, substantially as shown.

2. The combination, in a cotton-chopper, of the jointed frame, the spring, the revolving shaft, and the chopping-wheel secured thereto, substantially as described.

In testimony whereof I affix my signature in presence of two witnesses.

JULIAN TOLBERT MILLER.

Witnesses:
ABSALOM P. MILLER,
D. F. BRYAN.